Patented June 23, 1953

2,643,276

UNITED STATES PATENT OFFICE 2,643,276

NEGATIVE ELECTRODE FOR ALKALINE STORAGE BATTERIES AND METHOD OF MANUFACTURING THE SAME

Jean Salauze, Paris, France, assignor to Societe des Accumulateurs Fixes et de Traction, Romainville, France, a French body corporate No Drawing. Application January 22, 1951, Serial No. 207,237. In France December 14, 1950

14 Claims. (Cl. 136—23)

It is known that the negative electrode plates used in the construction of alkaline accumulators or storage batteries may include iron, or cadmium, or a mixture of iron and cadmium as the active substance therein. Zinc is purposely omitted from this enumeration because it operates as a soluble electrode and therefore has nothing to do with the ensuing discussion.

For very many years and even up to the present, the manufacture of such negative electrode plates included two definitely separate steps. First, a chemical process, i. e. preparing the active substance in a suitable form, generally as powders; next, a mechanical process, which included placing the active substance into shallow containers called pockets, having thin nickel-plated steel walls and formed with fine perforations; then, a number of such pockets thus filled were placed on a metal frame which constituted the electrode plate. In addition to the high cost of this rather lengthy and expensive procedure, its main drawback lies in the fact that the active substances are entrapped behind a steel wall in which the perforations are usually less in area than 10% of the solid area of the plate. Moreover, the compression imparted to the active substance on assembling the plates is not retained in full, and this results in a whole series of imperfect electric contacts obtained between the separate particles of the active substance, as well as between the particles and the metallic skeleton of the plate. The net result of all these shortcomings inherent in the above described method, is to hinder the exchanges between the interior and exterior of the pocket, and to produce a marked internal resistance. From the electrical standpoint, these drawbacks are manifested as an excessively high charging voltage, and, graver still, an excessively low discharge voltage, and one which is the lower as the discharge is effected at a more rapid rate. In the use of these plates in connection with accumulators serving for traction purposes, in which the discharge rates are not excessively high, this results merely in a drop in the energy efficiency ratio and a sluggishness at the high discharge rate peaks. However, in connection with the starting of internal combustion engines, where the accumulator has to develop exceedingly high current outputs, the accompanying drop in the output voltage may become disastrous.

It has been endeavored to simplify the construction and improve the above-described objectionable conditions by eliminating the use of the afore-mentioned perforate boxes. Many attempts have been made in this respect, but all except two have proved useless in practice.

One successful prior attempt, termed the "sintered plate" process comprises as its essential steps, stretching a fine wire mesh across a metal frame; coating this mesh with a thin uniform layer of an inert divided metal having a low apparent density; heating the whole assembly in a reducing atmosphere to a temperature high enough to cause a sintering, that is a surface melting effective to fuse the metal particles together and also to fuse the particles with the metallic parts of the mesh and frame. This yields an inert plate in which the degree of porosity may attain as much as 70 to 80%. There only remains to lodge the active substances within the pores. This is done by conducting repeatedly the following sequence of operations, viz.: impregnation with a concentrated solution of the selected active metal, decomposition by an alkaline base to form a hydrate with or without the use of electric current, flushing with water and drying.

This procedure is used industrially in preparing the positive plates. In this case, the metal powder of low apparent density which is sintered, is nickel as obtained from a decomposition of nickel carbonyl. It is also used in the production of cadmium-base negative plates. In this case, the metal powder may be nickel similar to that used for the positive plates, or a mixture of nickel and copper powders.

Another and more recent process has been developed by the applicant, for the manufacture of cadmium-base negative plates. This process also is characterized by the elimination of the perforate-walled boxes and by a distinctly simpler and cheaper procedure than that involving sintering. A mixture of pulverulent active materials, e. g. essentially cadmium and iron on the one hand and copper powder on the other, is prepared. The components of this mixture should possess a definitely predetermined physical form, namely that of needle-shaped (acicular) or arborescent crystals. The copper should compulsorily possess this form, and preferably the cadmium and iron mixture also possesses it, though this is not strictly essential. This powder is coated in a uniform layer a few millimeters deep over a fine wire mesh screen stretched across a frame. Very high compression is applied at ordinary room temperature. Owing to their particular form, the crystals become entangled or internested under the effect of pressure, and a plate is obtained which simultaneously possesses sufficiently high porosity, remarkably high cohesion and a substantial amount of resiliency. The plate thus obtained, during its use as a negative electrode in an alkaline accumulator, retains its original cohesion and compression. The remarkably close electrical contacts thus created remain and account for the excellent performance of such electrodes which, at the very high discharge rates, are higher in voltage output than the corresponding pocket-made plates and the sintered plates, while being simple and economical in construction.

As stated above, the idea has been conceived of using iron enclosed in shallow boxes (pockets) mentioned previously. Only one method of preparation has proved practicable: this is the low-temperature (500° C.) reduction with hydrogen, of powdered ferric oxide. Early in the 1900's, when the alkaline accumulator was first invented, Edison observed that when iron powder was used by itself—and is was then used in "pockets"—the discharge output voltage dropped off drastically as soon as it was attempted to make the element discharge output currents high in value. As early as 1903, Edison had discovered the necessity of mixing the pulverulent iron with other readily reducible substances, taken either in their metallic form, or in that of reducible oxides. Edison explained this by the fact that the conductivity of the active material was thus increased. About the same period, Swedish inventors advocated the use under similar conditions of mixtures of iron and cadmium (or oxides thereof). However, in industrial practice, only two techniques have been used; a predominating one, still used by the Edison Company in the United States of America, consists of mixing the reduced iron with 7% of yellow mercury oxide; the other, occasionally used in Europe, consists of substituting 20% of cadmium hydrate for the mercury oxide.

Whatever the particular one of these techniques was used in obtaining it, the negative active material consisting of iron was always enclosed in its perforate pocket, and has acquired a highly distinctive and highly constant character of its own, of which two basic, and besides interrelated, features, are: in the first place, a tendency to show an abnormally high voltage drop whenever the rate of discharge becomes too rapid, and in the second place, an incapacity to produce satisfactory values of output voltage and current capacity at the lower operating temperatures, as in winter use for example. Because of this incapacity, it has become commonplace to say that the cold "deactivates iron," or renders it "passive." Gradually this phrase has led to a widespread belief that the afore-said incapacity was an inherent, nature-willed property of iron, rather than a mere consequence of an incorrect utilization of iron, which has not been known how to correct up to this day.

In his patent relating the use of iron, Edison specifies: "Preferably, a sufficient amount of ammoniated copper and mercury oxide precipitate is added to the iron, in order to obtain as the final product a mixture consisting of 64% iron, 30% copper, and 6% mercury."

After this mixture has been effected, the iron reduces the copper and the mercury to their metallic state. Edison goes on to state that "It appears from this treatment that each particle of active material becomes coated with a porous film of copper amalgam in very finely divided form."

The desired object, i. e. "an improved electric contact," was in all likelihood not achieved for the following three reasons: first, the fact that a form of copper was produced much too highly divided in an absolutely unorganized or random state, resulting in an inordinately great, and for this very reason objectionable, number of electric contacts; then, the fact that copper amalgam is obtained, much less satisfactory from the electrical standpoint than pure copper; last, the incapacity of this mixture to retain the pressure imparted to it after it has been placed in pockets, since any agglomerating properties which may be possessed by the iron derived from oxide reduction are annihilated by the presence of a much too highly pulverulent copper. These causes account for the failure of the iron-copper-mercury mixture, which, as previously stated, has at no time been put to practical use.

It is the object of the present invention to remedy the above-discussed conditions and the invention relates essentially to a method of producing a negative electrode plate for alkaline accumulators which has none of the drawbacks mentioned hereinabove.

The method is essentially characterised in that it consists of using, as the basic substance, finely divided copper, but possessing a definite predetermined crystalline structure as defined by microscopic crystals of arborescent, acicular, dendritical or needlelike form, of intimately mixing this copper with pulverulent iron or an iron compound capable of being reduced to iron during the charging period of the accumulator, said iron or iron compound being used as the active substance, and of compressing this mixture at ordinary room temperature, under a very high pressure, on or around supports which may—or may not—form part of the finished electrode plate.

The applicant has found that negative electrode plates may in this way be produced which offer none of the characteristic shortcomings of iron, including the voltage drop at high discharge rates and low temperatures.

The invention further includes, by way of a new article of manufacture, a negative electrode plate when obtained by the above-described method, and essentially characterised in that it consists of a mixture of pulverulent iron (or iron compound reducible to iron during the charging of the accumulator) with finely divided copper consisting of microscopic crystals of acicular, dendritical, needlelike or arborescent form, said mixture having been subjected to a very high compression at ordinary room temperature.

Inasmuch as one of the components of the mixture forming the electrode, viz. the fine copper powder, necessarily is in the form of acicular or arborescent crystals (both these forms are interrelated), it possesses the desirable property of such crystals of yielding highly cohesive solids on compression, even at ordinary room temperatures (in the absence of any sintering process); the crystals become entangled and thus produce a kind of sintering effect. It is known that similar physical forms may be obtained by displacing copper from its solutions by means of more highly electro-negative metal powders; aluminum is especially suitable for this purpose. The two methods of producing copper just mentioned are in no way restrictive and have been mentioned merely by way of example.

The second component of the mixture is the iron powder or pulverulent iron compound capable of being converted to iron by the reducing action occurring on the negative electrode during the charging of the accumulator. Iron powders in different physical forms are not all adapted for use to an equal degree. Thus, one of the apparently most suitable forms is that of iron derived from a reduction of pulverulent ferric oxide with hydrogen or carbon monoxide. These contorted and irregularly-shaped particles are adapted to agglomerate under high pressure. Grades of powdered iron in other forms, while less desirable, are still usable in admixture with the copper powder; we may mention the iron derived from decomposition of iron-carbonyl, the grade of iron derived by grinding cohesive or dendritic electrolytic iron, that obtained by planing and grinding the planed shavings, etc. As iron compounds that are usable, very finely pulverised magnetic iron oxide $Fe_3O_4$ may be mentioned. As a general rule, this second constituent should be in a very fine pulverised form. If the physical form of the iron constituent particles used is such as to promote the agglomeration by pressure, as is the case for reduced iron, the proportions of the two constituents of the mixture, i. e. iron and copper, may be varied in a very wide range. On the other hand, where the physical form of the iron used is not such as to favor agglomeration, the predominating component in the mixture should be the copper powder, for in this case, the satisfactory quality of the agglomeration will be due exclusively to the favorable physical form of the copper.

The mixture is effected by the dry process, in a mixer of the Werner-Pfleiderer type, or in any other suitable apparatus. The mixture should be intimate, but it is important to effect it carefully in order not to break up the copper crystals. As said above, when using reduced iron, the composition may be varied very widely while still obtaining an excellent degree of agglomeration. In practice, the composition may be varied in the range of from 25% to 75% copper, these values being in no manner restrictive. Applicant has obtained remarkably satisfactory results with a proportion of about 50% copper and 50% reduced iron. When less favorable forms of iron or ferrous derivatives are used, somewhat more copper should be added, as between 40% to 80% for example, these figures again being given without any restrictive intention.

As to the frame, a metal frame of suitable shape is used, and a fine wire mesh, for instance of nickel-plated wire, is soldered over it. This wire mesh is imbedded in a layer of the pulverulent mixture prepared as just described. Preferably the layer should be homogeneous and its depth is uniform and will depend on the thickness of the desired plate. By way of illustration, a layer 4 mm. deep will yield after compression at 3 tons per square centimeter, a plate about 1.2 mm. thick.

The assembly is next very strongly compressed on a press. The press used should have a capacity of at least one ton per square centimeter area. There are, of course, no definite limits to the pressure that may be used. However, should the pressure be too weak, cohesion will be apt to be inadequate and the resulting electric contacts poor.

If the pressure is too high, the porosity of the plate will in turn be liable to prove insufficient. By way of indication and as an illustration of the orders of magnitude involved, it has been found that desirable results are obtained by the use of pressures of from one to three tons per square centimeter, in treating mixtures containing 50% copper and 50% iron reduced at 500° C. with hydrogen. These data are not restrictive and have a merely exemplary significance.

When operating in the manner described, a highly cohesive plate is obtained, which can be industrially handled without breaking and retains its cohesion and its compression without showing any sign of disaggregation during the repeated charge and discharge processes of the accumulator.

The above described method involving compression of the pulverulent mixture around a mesh stretched across a frame, has been given only as one example of a particularly practical embodiment. The underlying principles may be carried into effect by other alternative procedures; rather than using a metal frame supporting a wire mesh stretched across and welded to it, a wire mesh without any supporting frame may be used; one might also be content with using a welded wire mesh with a simple metal head-plate or flange. It is also possible to omit the metal support entirely and simply produce the plates by compressing the powder mixture, the resulting electrode plates being then assembled with the element by using any of the previously known processes. However, according to the invention, it has been found more desirable to use a wire mesh soldered to a frame or a head-plate, as described above. The advantage is that the presence of an armature or skeleton (similar to that present in reinforced glass) prevents the bits from falling apart in case of accidental breakage.

The very high pressures used require the use of especially powerful and expensive presses. If the desired plate is of too large a size, it may be produced in several steps, to avoid having to use gigantic presses. In this case, the accumulator electrode plate is obtained by juxtaposing the separately-compressed individual elements. Merely as an indication, the following method of construction may be mentioned; each individual element is for instance in the shape of a rectangle comprising a wire mesh embedded in the compressed powder agglomerate preliminarily stretched—or not—across a frame and provided with metallic extensions to be subsequently crimped or soldered to a metal frame of suitable shape which will constitute the plate.

As said above, the negative plates thus obtained, aside from the simplicity of their manufacture, display remarkable properties, including: increased specific mass-capacity of the divided iron over that obtained when the iron is mounted in pockets; very low discharge voltage decrease, even at very rapid discharge rates (starting batteries); and the retention of these properties at low temperatures. Thus, by using positive plates all identical with one another, so as to construct elements having identical characteristic, it is found that the elements provided with negative plates according to the present invention, possess discharge voltages improved over those obtained with any other known type of negative plate, whether using iron or cadmium. It is quite remarkable to find that this advantage over negative cadmium plates is retained even where the above-described iron negative plates are operated in cold weather.

It will be obvious that, if deemed necessary, any other desired elements in suitably selected proportions may be added to the iron-copper mixture so long as they do not nullify the benefits of the use of iron.

It will be understood that the invention is in nowise restricted to the forms of embodiment or to the proportions indicated, given by way of example merely.

What I claim is:

1. A method of producing a negative plate for an alkaline electric accumulator, comprising the steps of preparing a mixture by intimately mixing a finely divided copper composed of minute crystals having an acicular, arborescent, dendritical or needle-like shape, with an active negative material consisting of finely-divided iron providing substance, said active negative material in said mixture being in the proportions of between 20% and 80% and preferably in the proportion of 50% of said mixture, coating the mixture over and into the interstices of a wire mesh-like support and compressing the coated assembly at substantially ordinary room temperature and at a pressure of at least 1 metric ton per square centimeter.

2. A method of producing a large negative electrode plate for an alkaline electric accumulator, comprising the steps of preparing a mixture by intimately mixing a finely-divided copper composed of minute crystals having an acicular, arborescent, dendritical or needle-like shape, with an active negative material which is a finely-divided iron providing substance, said active negative material in said mixture being in the proportions of between 20% and 80% and preferably in the proportion of 50% of said mixture, coating the mixture over and into interstices of each of a number of separate juxtaposable wire mesh-like supporting elements having assembly lugs projecting from the sides thereof, compressing at substantially ordinary room temperature each coated element separately in a press at a pressure of at least 1 metric ton per square centimeter, and assembling the compressed coated elements to produce the finished plate.

3. Method according to claim 1 where the divided iron providing substance is a product made by thermal reduction of ferric oxide by hydrogen.

4. Method according to claim 1 where the divided iron providing substance is iron produced by thermal reduction of ferric oxide by hydrogen.

5. Method according to claim 1 where the divided iron providing substance is magnetic iron oxide produced by thermal reduction of ferric oxide by hydrogen.

6. Method according to claim 1 where the divided iron providing substance is ferric oxide.

7. Method according to claim 2 where the divided iron providing substance is an iron-containing product of the thermal reduction of ferric oxide by hydrogen.

8. Method according to claim 2 where the divided iron providing substance is ferric oxide.

9. A negative electrode plate for an alkaline electric accumulator which comprises a frame, and a wire mesh-like supporting element carried by said frame, said wire mesh-like element being embedded in a highly compressed mixture of negative active material and a finely divided copper composed of minute crystals having an acicular, arborescent needlelike or dendritical shape and said negative active material consisting of an iron providing substance which in said mixture has the proportions of between 20% and 80% and preferably the proportion of 50% thereof.

10. Negative electrode plate as in claim 9 wherein said iron providing substance is an iron-containing product of the thermal reduction of ferric oxide by hydrogen.

11. Negative electrode as in claim 9 wherein the iron-providing substance is ferric oxide.

12. A negative electrode plate for an alkaline electric accumulator which comprises a plurality of juxtaposed frames, wire mesh-like elements, one being stretched across and welded to each of said frames, assembly lugs projecting from the frames, said elements being embedded in a highly compressed mixture consisting of a negative active material and a finely-divided copper composed of minute crystals having an acicular, arborescent, needle-like or dendritical shape, and said negative active material being a finely-divided, pulverulent iron-providing substance, which in said mixture has the proportions of between 20% and 80% thereof.

13. The negative electrode of claim 12, wherein the proportion of said iron-providing substance in said mixture is preferably 50% thereof.

14. Negative electrode plate as in claim 12 wherein said wire mesh is made of nickel plated wire.

JEAN SALAUZE.

References Cited in the file of this patent

UNITED STATES PATENTS

| Number | Name | Date |
|---|---|---|
| 2,178,527 | Wellman | Oct. 31, 1939 |
| 2,277,107 | Imes | Mar. 24, 1942 |
| 2,347,172 | Cox | Apr. 25, 1944 |
| 2,455,804 | Ransley | Dec. 7, 1948 |
| 2,554,125 | Salauze | May 22, 1951 |